US012811808B2

(12) United States Patent
Huang et al.

(10) Patent No.: US 12,811,808 B2
(45) Date of Patent: Nov. 24, 2026

(54) METHOD, APPARATUS, DEVICE AND STORAGE MEDIUM FOR DEVICE AUTHENTICATION AND CHECKING

(71) Applicant: Douyin Vision (Beijing) Co., Ltd., Beijing (CN)

(72) Inventors: Yangkun Huang, Beijing (CN); Zhoushu Huang, Beijing (CN)

(73) Assignee: Douyin Vision (Beijing) Co., Ltd., Beijing (CN)

( * ) Notice: Subject to any disclaimer, the term of this patent is extended or adjusted under 35 U.S.C. 154(b) by 16 days.

(21) Appl. No.: 18/836,689

(22) PCT Filed: May 11, 2023

(86) PCT No.: PCT/CN2023/093556
§ 371 (c)(1),
(2) Date: Aug. 7, 2024

(87) PCT Pub. No.: WO2023/236720
PCT Pub. Date: Dec. 14, 2023

(65) Prior Publication Data

US 2025/0168017 A1 May 22, 2025

(30) Foreign Application Priority Data

Jun. 7, 2022 (CN) ......................... 202210642088.1

(51) Int. Cl.
*H04L 9/40* (2022.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/3247* (2013.01)

(58) Field of Classification Search
None
See application file for complete search history.

(56) References Cited

U.S. PATENT DOCUMENTS

2007/0004386 A1* 1/2007 Singh .................... H04W 12/08 455/414.1
2017/0295168 A1* 10/2017 Wan .................... H04L 63/0876
(Continued)

FOREIGN PATENT DOCUMENTS

CN 1787525 A 6/2006
CN 105978682 A 9/2016
(Continued)

OTHER PUBLICATIONS

Office action received from Chinese patent application No. 202210642088.1 mailed on Dec. 20, 2023, 28 pages (18 pages English Translation and 10 pages Original Copy).

*Primary Examiner* — Amir Mehrmanesh
*Assistant Examiner* — Hassan Saadoun

(57) ABSTRACT

According to embodiments of this disclosure, a method, apparatus, device and storage medium for device authentication and checking are provided. The method of device authentication includes: sending, at a first device, a device activation request to a second device, the device activation request comprising identity authentication information of the first device; and in response to receiving an activation certificate from the second device, storing the activation certificate in a trusted environment associated with the first device. The method further includes: sending a certificate signing request to the second device, the certificate signing request being generated based at least in part on the activation certificate in the trusted environment; and storing a device certificate received from the second device in the trusted environment, the device certificate being generated based on the certificate signing request.

19 Claims, 10 Drawing Sheets

(56) References Cited

U.S. PATENT DOCUMENTS

| | | | | |
|---|---|---|---|---|
| 2018/0351748 | A1* | 12/2018 | Pai | G06F 11/1469 |
| 2019/0140846 | A1* | 5/2019 | Moore | G06F 21/53 |
| 2020/0322170 | A1* | 10/2020 | Jin | H04L 41/0806 |
| 2022/0271946 | A1* | 8/2022 | Hovsepian | H04L 9/085 |
| 2022/0321362 | A1* | 10/2022 | Konda | G06F 21/57 |
| 2022/0385483 | A1* | 12/2022 | Tschofenig | H04L 9/0877 |
| 2023/0128572 | A1* | 4/2023 | Khatri | G06Q 30/018 705/28 |

FOREIGN PATENT DOCUMENTS

| | | | |
|---|---|---|---|
| CN | 108769043 | A | 11/2018 |
| CN | 108990060 | A | 12/2018 |
| CN | 111625781 | A | 9/2020 |
| CN | 112511316 | A | 3/2021 |
| CN | 114207618 | A | 3/2022 |
| CN | 114257382 | A | 3/2022 |
| CN | 114362951 | A | 4/2022 |
| CN | 115037480 | A | 9/2022 |

* cited by examiner

METHOD, APPARATUS, DEVICE AND STORAGE MEDIUM FOR DEVICE AUTHENTICATION AND CHECKING

This application claims the benefit of Chinese Patent Application No. 2022106420881, filed on Jun. 7, 2022, entitled "METHOD, APPARATUS, DEVICE AND STORAGE MEDIUM FOR DEVICE AUTHENTICATION AND CHECKING", which is hereby incorporated by reference in its entirety.

FIELD

Example embodiments of the present disclosure generally relate to the field of computers, and in particular, to a method, apparatus, device and storage medium for device authentication and checking.

BACKGROUND

At present, with the development of communication technologies, more and more users obtain different types of services from service providers through intelligent communication devices such as smart phones, tablets and wearable devices. However, lawbreakers tend to utilize such devices to facilitate counterfeiting and spoofed features to perform a large number of virtual replications to perform illegal behaviors such as identity cheating and illegal profit. Therefore, there is a need for an effective means to eliminate the vulnerability risk of such illegal profit from the source.

SUMMARY

In a first aspect of the present disclosure, a method for device authentication is provided. The method includes sending, at a first device, a device activation request to a second device, the device activation request comprising identity authentication information of the first device; and in response to receiving an activation certificate from the second device, storing the activation certificate in a trusted environment associated with the first device. The method further includes: sending a certificate signing request to the second device, the certificate signing request being generated based at least in part on the activation certificate in the trusted environment; and storing a device certificate received from the second device in the trusted environment, the device certificate being generated based on the certificate signing request.

In a second aspect of the present disclosure, a method of device checking is provided. The method includes searching an activation certificate in a trusted environment associated with a first device, the activation certificate being generated by a second device for authenticating the first device; and in response to determining that the activation certificate exists in the trusted environment, performing local verification on the activation certificate. The method further includes, in response to the activation certificate passing the local verification, generating an activated checking identification for identity checking of the first device for local service.

In a third aspect of the present disclosure, a method for device authentication is provided. The method includes, in response to receiving a device activation request from a first device, verifying, at a second device, identity authentication information of the first device indicated in the device activation request; and in response to the verification of the identity authentication information being successful, sending an activation certificate to the first device. The method further includes, in response to receiving a certificate signing request from the first device, sending a device certificate to the first device, the device certificate being generated based on the certificate signing request.

In a fourth aspect of the present disclosure, an apparatus for device authentication is provided. The apparatus includes an activation request sending module configured to send a device activation request to a second device, the device activation request comprising identity authentication information of the first device; an activation certificate storage module configured to, in response to receiving an activation certificate from the second device, store the activation certificate in a trusted environment associated with the first device; a certificate signing request sending module configured to send a certificate signing request to the second device, the certificate signing request being generated based at least in part on the activation certificate in the trusted environment; and a device certificate storage module configured to store a device certificate received from the second device in the trusted environment, the device certificate being generated based on the certificate signing request.

In a fifth aspect of the present disclosure, an apparatus for device checking is provided. The device comprises an activation certificate searching module configured to search an activation certificate in a trusted environment associated with a first device, the activation certificate being generated by a second device for authenticating the first device; a local verification module configured to, in response to determining that the activation certificate exists in the trusted environment, perform local verification on the activation certificate; and an activated checking identification generation module configured to, in response to the activation certificate passing the local verification, generate an activated checking identification for identity checking of the first device for local service.

In a sixth aspect of the present disclosure, an apparatus for device authentication is provided. The apparatus includes an authentication information verification module configured to, in response to receiving a device activation request from a first device, verify identity authentication information of the first device indicated in the device activation request; an activation certificate sending module configured to, in response to the verification of the identity authentication information being successful, send an activation certificate to the first device; and a device certificate sending module configured to, in response to receiving a certificate signing request from a first device, send a device certificate to the first device, the device certificate being generated based on the certificate signing request.

In a seventh aspect of the present disclosure, an electronic device is provided. The device includes at least one processing unit; and at least one memory coupled to the at least one processing unit and storing instructions for execution by the at least one processing unit, the instructions, when executed by the at least one processing unit, causing the electronic device to perform the method of the first aspect, the second aspect, or the third aspect.

In an eighth aspect of the present disclosure, a computer readable storage medium is provided. The medium stores a computer program which, when executed by the processor, implements the method according to the first aspect, the second aspect, or the third aspect.

It should be understood that the content described in the SUMMARY part of the present disclosure is not intended to limit the key features or important features of the embodiments of the present disclosure, nor is it intended to limit the scope of the present disclosure. Other features of the present disclosure will become easily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
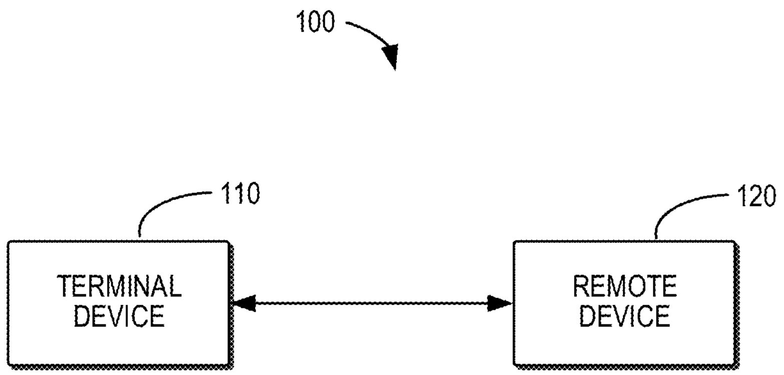
FIG. 1 illustrates a schematic diagram of an example environment in which the embodiments of the present disclosure can be implemented.

The embodiments of the present disclosure will be described in more detail below with reference to the accompanying drawings. While certain embodiments of the present disclosure are shown in the accompanying drawings, it should be understood that the present disclosure may be implemented in various forms and should not be construed as limited to the embodiments set forth herein, but rather, these embodiments are provided for a more thorough and complete understanding of the present disclosure. It should be understood that the drawings and embodiments of the present disclosure are for example purposes only and are not intended to limit the scope of the present disclosure.

In the description of the embodiments of the present disclosure, the terms "including" and the like should be understood to include "including but not limited to". The term "based on" should be understood as "based at least in part on". The terms "one embodiment" or "the embodiment" should be understood as "at least one embodiment". The term "some embodiments" should be understood as "at least some embodiments". Other explicit and implicit definition may also be included below.

As described above, when a user obtains a corresponding service using an intelligent communication device such as a smart phone, a smart tablet, or a wearable device, they often face the risk of device counterfeiting and impersonation. The lawbreakers do identity cheating by counterfeiting and impersonating devices and then obtain illegal profits.

At present, there is a lack of effective means to identify illegal behaviors such as using simulators to create virtual devices to cheat, stealing or forging real users' device information to perform illegal operations, and using forged device information to defraud unauthorized service resources from the server side, resulting in the risk of damage to the interests of both users and servers.

In the embodiments of the present disclosure, the term "device authentication" may refer to an identity information registration and state activation process of a terminal device at a remote device. In the embodiments of the present disclosure, the term "device checking" may refer to identity verification performed on the terminal device according to the identity information of the terminal device that has been authenticated in the device authentication process in a process of requesting local or remote service of the terminal device.

According to various embodiments of the present disclosure, a solution for device authentication and checking is provided. For example, in a process in which the terminal device performs identity authentication, the service provider can provide an activation certificate for the terminal device to the device based on the identity authentication information of the terminal device. After storing the activation certificate to a trusted environment (TEE) of the terminal device, the terminal device sends a certificate signing request to the service provider. The service provider generates a device certificate by signing the public key generated by the terminal device in the certificate signing request and sends the device certificate to the terminal device. The terminal device stores the device certificate in the TEE, to complete the authentication process of the terminal device.

If the terminal device requests the local or remote related service, if the terminal device finds the activation certificate for the terminal device in its trusted environment, the legality and validity verification are performed on the activation certificate. In one aspect, if the activation certificate is successfully validated, an activated identifier is generated for signature verification for locally accessible authorization services and resources. In another aspect, if the activation certificate is successfully verified, the terminal device may send a remote service request to the service provider by using the private key of the terminal device, and the service provider may use the public key in the device certificate to verify the service request to send a response to the service request.

According to an implementation of the present disclosure, by using the activation certificate and the device certificate and in combination with the digital signature in a trusted environment (TEE) to mutually confirm the identity and authorization service between the device side and the server side, a more trusted device identity authentication and checking process may be provided. In this way, counterfeiting and spoofed use of the device can be eliminated and the illegal access to service resources on the local or server side of the device can be prevented.

Example Environment

Reference is first made to FIG. 1, which schematically illustrates a schematic diagram of an example environment 100 in which example implementations according to the present disclosure may be implemented.

As shown in FIG. 1, the environment 100 may include a terminal device 110 (which may also be referred to as a first device in the present disclosure) and a remote device 120 (which may also be referred to as a second device in the present disclosure). In example environment 100, the remote device 120 may communicate with the terminal device 110 to provide the service requested by the terminal device 110.

In some embodiments, the service requested by the terminal device 110 may include, for example, a service directly obtained from the remote device 120, or may include a service provided by the remote device 120 to an application installed on the terminal device 110.

In some embodiments, in a process in which the terminal device 110 establishes a connection with the remote device 120 and requests the required service, the remote device 120 may authenticate the identity of the terminal device 110 to determine a service permission that can be requested by the terminal device 110, thereby providing the terminal device 110 with a service in a range allowed by the service permission.

In some embodiments, the terminal device 110 may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio broadcast receiver, an electronic book device, a gaming device, or any combination of the foregoing, including accessories and peripherals of these devices, or any combination thereof. In some embodiments, the terminal device 110 can also support any type of interface for a user (such as a "wearable" circuit, etc.). The remote device 120 may be, for example, various types of computing systems/servers capable of providing computing power, including, but not limited to, mainframes, edge computing nodes, computing devices in a cloud environment, and the like.

It should be understood that the structure and function of the environment 100 is described for example purposes only and does not imply any limitation to the scope of the present disclosure.

Process of Device Authentication

Figure 2:
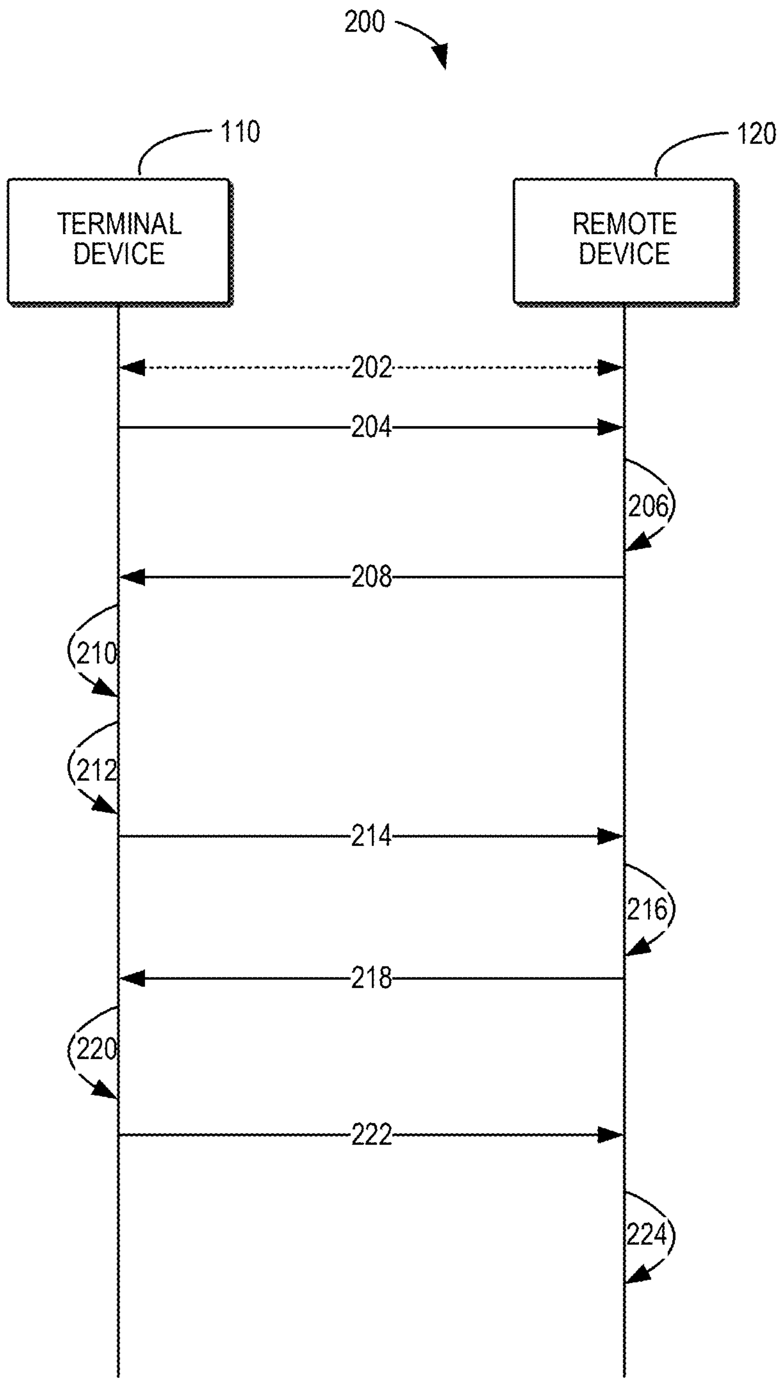
FIG. 2 illustrates a schematic diagram of an interaction process for device authentication according to some embodiments of the present disclosure.

FIG. 2 illustrates a schematic diagram of a process 200 for device authentication according to some embodiments of the present disclosure. The process 200 may be implemented at the terminal device 110 and the remote device 120. For case of discussion, the process 200 will be described with reference to the environment 100 of FIG. 1.

Referring now to FIG. 2, the terminal device 110 sends (204), to the remote device 120, an authentication activation request for the terminal device 110. The authentication activation request may include identity authentication information of the terminal device 110.

In some embodiments, the identity authentication information may include a device identification (Device ID) of the terminal device 110. The device identification is a unique identity identification of the terminal device 110, and may generally be a chip identification of the terminal device 110 or a production serial number of the terminal device 110. The device identification may be written into a trusted environment associated with the terminal device 110 when the terminal device 110 is manufactured to ensure authenticity and immutability of each read.

In some embodiments, the identity authentication information may further include password information such as an activation code of the terminal device 110 itself or an account cipher of an application or service requested by the terminal device 110. It should be understood that, in different request activation scenarios for the terminal device 110, the identity authentication information may include other information corresponding to the current request activation scenario.

The remote device 120 verifies the identity authentication information received by the terminal device 110. In some implementations, the remote device 120 may determine, based on the identity authentication information, a service range that the terminal device 110 is authorized, for example, a service that may be used by the terminal device 110. Alternatively, or additionally, the remote device 120 may further determine that the terminal device 110 may use the aging of these services. The remote device 120 may generate an authorization content for the terminal device 110 based on the content determined above.

In some embodiments, the remote device 120 may generate a pair of asymmetric key pairs (also referred to as a first asymmetric key pair in the present disclosure). The first asymmetric key pair may be generated, for example, by a public key system (RSA). Alternatively, or additionally, the asymmetric key pair may also be generated by other digital signature methods such as a digital signature algorithm (DSA), an elliptic curve digital signature algorithm (ECDSA), or the like.

The remote device 120 may perform a hash calculation on the determined authorization content for the terminal device 110 to generate a digest value. By encryption the authorized content and the digest value with a first private key in the first asymmetric key pair, the remote device 120) may generate (206) an activation certificate (activate.crt) for the terminal device 110. A first public key of the first asymmetric key pair may be included in the activation certificate in addition to the encrypted content credit. In addition, the activation certificate may further include a device identity identification of the terminal device 110. It should be understood that an activation certificate is uniquely issued by the remote device 120 to a terminal device.

The remote device 120 sends (208) the generated activation certificate to the terminal device 110. After receiving the activation certificate, the terminal device 110 may perform signature verification on the activation certificate. For example, the terminal device 110 may decrypt the signature of the activation certificate by using the first public key in the activation certificate to obtain field information in the activation certificate, for example, the authorization content and the digest value associated with the authorization content. The terminal device 110 may perform hash calculation on the authorization content to generate another digest value and compare another digest value with the digest value obtained by decrypting the activation certificate. If the two digest values are the same, it indicates that the activation certificate is successfully verified.

The successfully verified activation certificate may be stored (210) by the terminal device 110 into a trusted environment associated with the terminal device 110. In some embodiments, the trusted environment of the terminal device 110 depends on the type of operating system running on the terminal device 110. For example, if the system running on the terminal device 110 is an Android® system, the trusted environment may be an Android® system based trusted environment. Alternatively, or additionally, the trusted environment of the terminal device 110 may further depend on other hardware and/or software environments associated with the terminal device 110. By introducing a trusted environment, sensitive information such as a certificate of a trust bearer and a key cannot be leaked.

A pair of asymmetric key pairs (also referred to as a second asymmetric key pair in this disclosure) may also be generated at the terminal device 110. The terminal device 110 may encrypt, by a second private key in the second asymmetric key pair, the field information obtained from the activation certificate, for example, the authorization content, and generate (212) a certificate signing request based on the encrypted field information and the second public key in the second asymmetric key pair. The certificate signing request may be, for example, a Certificate Signing Request (CSR).

The terminal device 110 sends (214) the certificate signing request to the remote device 120. The remote device 120 may generate (216) a device certificate based on the certificate signing request.

Optionally, the remote device 120 may encrypt the second public key and the field information included in the certificate signing request by using a third private key in a third asymmetric key pair to generate the device certificate (device.crt). The device certificate may further include a third public key in the third asymmetric key pair.

In addition, the device certificate may further include a device identity identification of the terminal device 110. It should be understood that a device certificate is uniquely issued by the remote device 120 to a terminal device.

The remote device 120 sends (218) the device certificate to the terminal device 110. The terminal device 110 may obtain the second public key and the field information by decrypting the device certificate by using the third public key. If the terminal device 110 determines that the second public key is not tampered with, it stores (220) the device certificate into a trusted environment. In addition, the terminal device 110 may further send an activation acknowledgement request for the terminal device 110 to the remote device 120. Once the remote device 120 receives the activation acknowledgement request, the current state of the terminal device 110 is set to active.

Optionally, the terminal device 110 may restart the device after sending the activation acknowledgement request to the remote device 120.

In the example process 200 shown in FIG. 2, alternatively or additionally, the terminal device 110 may establish (202) a secure connection with the remote device 120. In some embodiments, the secure connection may be an mTLS connection. The mTLS connection is a connection based on a link layer security protocol, which can establish a bidirectional encrypted tunnel between the terminal device 110 and the remote device 120 to ensure communication security between the terminal device 110 and the remote device 120. Once the mTLS connection, communication between the terminal device 110 and the remote device 120 may take place under the link layer security protocol. For example, the authentication activation request and the certificate signature request sent by the terminal device 110 to the remote device and the activation certificate and the device certificate sent to the terminal device by the remote device 120 may both be transmitted via the mTLS connection.

By adopting the mTLS based secure connection, the secure channel of trust transfer can be constructed at the initial stage of information exchange between the terminal device 110 and the remote device 120, thereby providing a preliminary security guarantee for the communication process between the terminal device 110 and the remote device 120.

In some implementations, the mTLS connection may be established by a predetermined certificate (pre.crt). The predetermined certificate may be included in a factory setting of the terminal device 110. The predetermined certificate includes a private key (pre.key). The private key may be stored in the terminal device 110. The predetermined certificate may further include a batch certificate of the terminal device 110 and a public key of the predetermined certificate. The predetermined certificate may be set to a long-term valid type of certificate.

In some embodiments, the same predetermined certificate may be configured for different terminal devices. For example, different terminal devices may be different terminal devices manufactured in a same batch. In this way, costs brought by respectively configuring different predetermined certificates for different terminal devices may be reduced.

It should be understood that the mTLS connection established between the terminal device 110 and the remote device 120 is only an implementation of the present disclosure. Alternatively, or additionally, the terminal device 110 and the remote device 120 may also communicate based on another security protocol.

In this way, the terminal device 110 and the remote device 120 each hold a digital certificate including the authentication content, so that the server can perform the complete identity authentication on the device by nesting the activation certificate and the device certificate.

In the device authentication process described in connection with FIG. 2, the terminal device 110 ensures reliability of the device authentication process by obtaining the security certificate issued by the remote device 120 in the trusted environment. In some embodiments, the interaction between the terminal device 110 and the remote device 120 may further include interaction between components related to the remote device 120 and components related to the terminal device 110.

Figure 3:
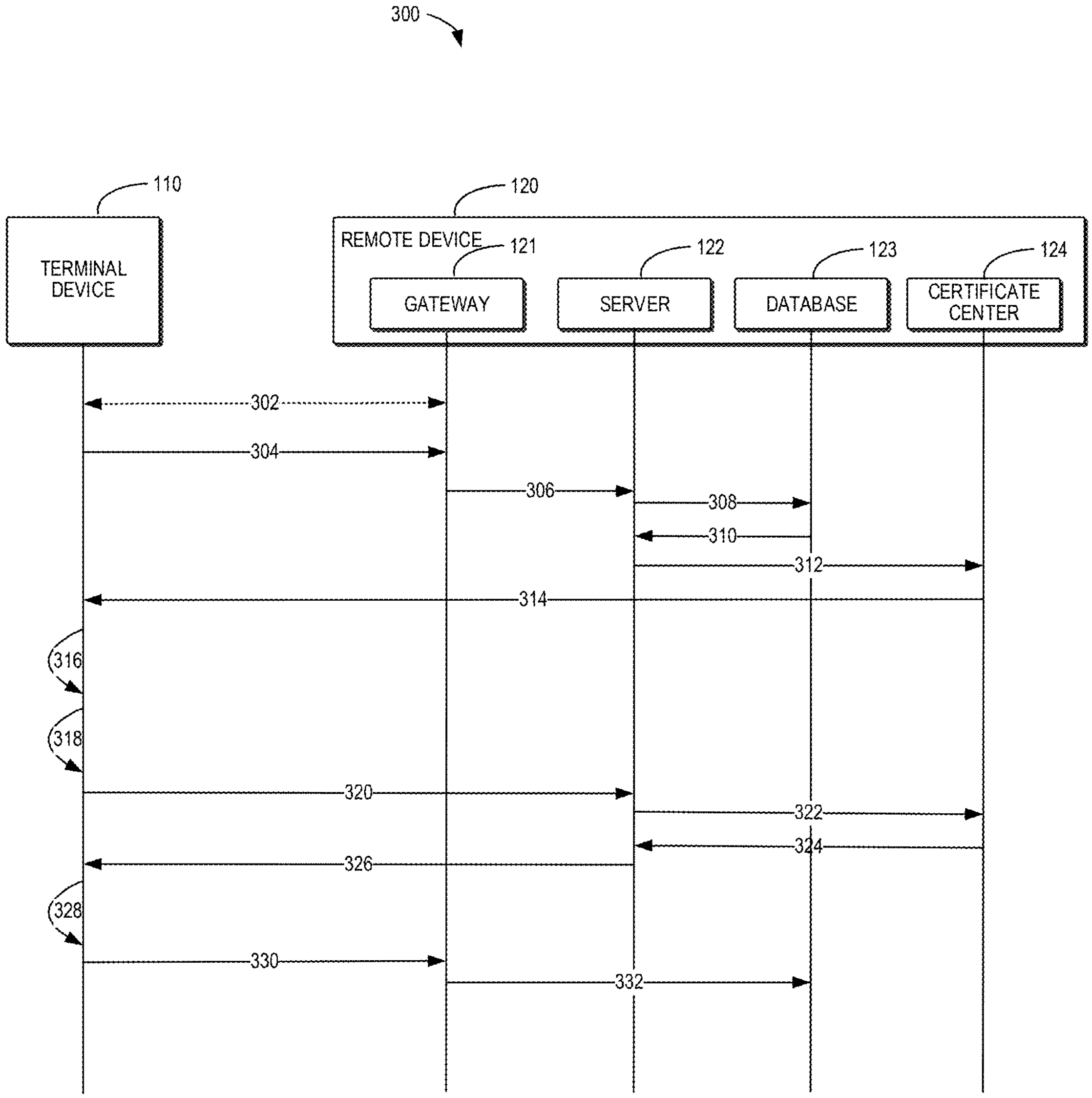
FIG. 3 illustrates a schematic diagram of an interaction process for device authentication according to some embodiments of the present disclosure.

FIG. 3 illustrates a schematic diagram of an interaction process for device authentication according to some embodiments of the present disclosure. In FIG. 3, the remote device 120 may include a gateway 121, a service 122, a database 123, and a certificate center 124. The process 300 of device authentication is described in further detail below in conjunction with FIG. 3. The detailed description of the same or similar steps as the process 200 in the process 300 is not repeated here.

Referring now to FIG. 3, the terminal device 110 may establish (302) a secure connection with a gateway 121. The terminal device 110 sends (304), to the gateway 120, an authentication activation request for the terminal device 110. The authentication activation request may include identity authentication information of the terminal device 110. The gateway 121 forwards (306) the authentication activation request to the server 122. The server 122 may query (308) the identity authentication information associated with the terminal device 110 from the database 123. If the database 123 determines that the received identity authentication information of the terminal device 110 matches the identity authentication information queried in the database 123, the result of the query success is sent (310) to the server 122. The server 122 generates an activation certificate issuance request and sends 312 the activation certificate issuance request to the certificate center 124. For example, the issuance request may include a service range authorized of the terminal device 110 determined by the server 122, for example, a service that can be used by the terminal device 110.

In some embodiments, the certificate center 124 may generate, by using a hash calculation, a digest value of a service range (also referred to as authorization content in this disclosure) authorized for the terminal device 110, and encrypt the authorization content and the digest value by using the first private key in the first asymmetric key pair to generate the activation certificate. The activation certificate is sent (314) from the certificate center 124 to terminal device 110 via the server 123 and the gateway 122. The activation certificate may include the first public key in the first asymmetric key pair.

After the activation certificate is successfully verified by the terminal device 110 based on the first public key, the terminal device 110 stores (316) the activation certificate into a trusted environment.

The terminal device 110 may encrypt the field information, e.g., the authorization content, obtained from the activation certificate by the second private key in the second asymmetric key pair generated by it, and generate (318) a certificate signing request based on the encrypted field information and the second public key in the second asymmetric key pair.

The terminal device 110 sends (320) the certificate signing request to the server 122 via the gateway 121. The server 122 calls (322) a certificate issuing interface of the certificate center 124 based on the certificate signing request. At the certificate center 124, the second public key and the field information included in the certificate signing request may be encrypted by using the third private key in the third asymmetric key pair to generate the device certificate. The device certificate may further include the third public key in the third asymmetric key pair.

The certificate authority 124 sends (324) the issued device certificate to the server 122, which sends (326) the device certificate to the terminal device 110 via the gateway 121.

Terminal device 110 stores (328) the device certificate into a trusted environment and sends (330) an activation acknowledgement request to the server 122 via the gateway 121. The server 122 requests (332) the database 123 to change the state of the terminal device 110 in the database 123 to be activated successfully after receiving the activation confirmation request.

The interaction process between the terminal device 110 and a corresponding component in the remote device 120 is further described through FIG. 3. It should be understood that FIG. 3 illustrates only components included in the remote device 120. The components included in the remote device 120 shown in FIG. 3 may be modified or replaced.

Process of Device Checking

Figure 4:
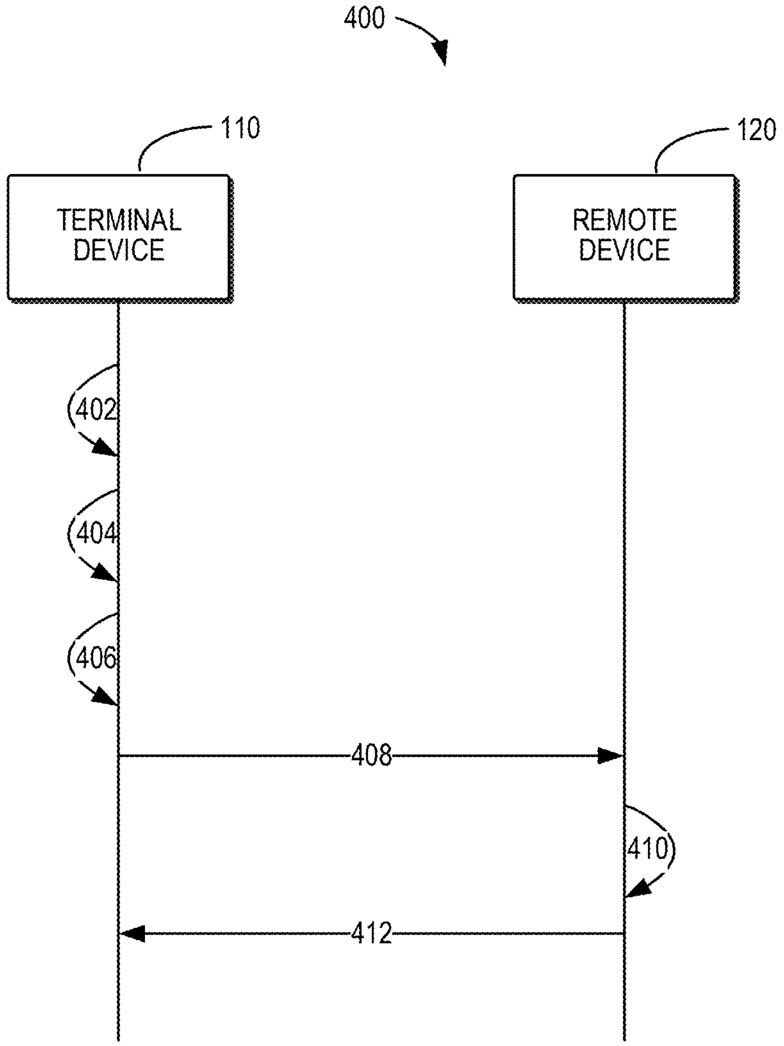
FIG. 4 illustrates a schematic diagram of an interaction process for device checking according to some embodiments of the present disclosure.

If the terminal device 110 requests the local or remote service, the security certificate obtained in the device authentication process described in connection with FIG. 2 and FIG. 3 may be used to ensure data security of the service provider and the service receiver at the same time. FIG. 4 illustrates a flowchart of a process 400 of device checking according to some embodiments of the present disclosure. The process 400 may be implemented at the terminal device 110 and the remote device 120. For case of discussion, the process 400 will be described with reference to the environment 100 of FIG. 1.

Referring now to FIG. 4, after the terminal device 110 is restarted or powered on, the terminal device 110 searches (402) whether an activation certificate is stored in its trusted environment. If it is determined that the activation certificate already exists, the terminal device 110 may determine whether the activation certificate is still valid based on the legality and/or a validity of the activation certificate indicated in the activation certificate.

If it is determined that the activation certificate does not exist, an activation state identification is generated to trigger, for example, the device authentication process described in connection with FIGS. 2 and 3.

In some embodiments, if the terminal device 110 determines that the activation certificate is still valid, an activation state identification is generated (404). The activation state identification may be generated, for example, by a device certificate stored in a trusted environment associated with the terminal device 110. For example, the digest value is generated based on the field information (for example, the authorization content) in the device certificate by using the hash calculation, and then the digest value is encrypted by using a private key in the second asymmetric key pair generated by the terminal device 110 to generate the activation state identification.

In some embodiments, if the terminal device 110 determines that the activation certificate is invalid or tampered with, it triggers a shutdown of the terminal device 110 and/or sends a warning to the remote device 120.

As already described above, the terminal device 110 may request a local service or a remote service. The local service may be considered a service that has been provided locally by the remote device 120 to the terminal device 110, which may include an offline service that has been installed at the terminal device 110 or has been authorized at the terminal device 110, such as an offline service, an offline game, or an offline book provided by an application installed on the terminal device 110. Instead, the remote service may be viewed as an online service that needs to be provided by the remote device 120.

When requesting the local service, the terminal device 110 may perform (406) signature verification on the generated activation state identification. In the verification process, the activation state identification is decrypted by using the public key in the second asymmetric key pair generated by the terminal device 110 to obtain the digest value. The terminal device 110 may compare the decrypted digest value with the digest value obtained through hash calculation, and if the digest values match each other, it is determined that the signature verification performed on the generated activation state identification is successful. The terminal device 110 may access or obtain the requested local service. If the two do not match, then the requested service is denied to the terminal device 110.

If the remote service is requested, it is also necessary to perform signature verification on the generated activation state identification. If the activation state identification is successfully verified, the service request is generated by encrypting the requested remote service content by using the private key in the second asymmetric key pair generated by the terminal device 110. The terminal device 110 sends (408) the service request to the remote device 120. The remote device 120 decrypts the service request by using the public key in the second asymmetric key pair generated by the terminal device 110 to verify (410) the service request. Similarly, the remote device 120 obtains the requested service content by decrypting the public key and the digest value obtained by performing hash calculation on the service content by the terminal device 110. The remote device 120 may perform hash calculation on the requested service content to obtain a digest value, and compare the digest value with the digest value obtained through decryption. If the two match each other, it is determined that the service request was successfully verified. In this case, the remote device 120 may provide (412) its requested service content to the terminal device 110.

In this way, in the process of the device performing the service request, the device identity is verified based on the security certificate obtained in the device authentication stage, thereby effectively preventing counterfeiting and impersonation of the device, and thus preventing the interests of the service provider and the service receiver from being illegally infringed.

Example Processes

Figure 5:
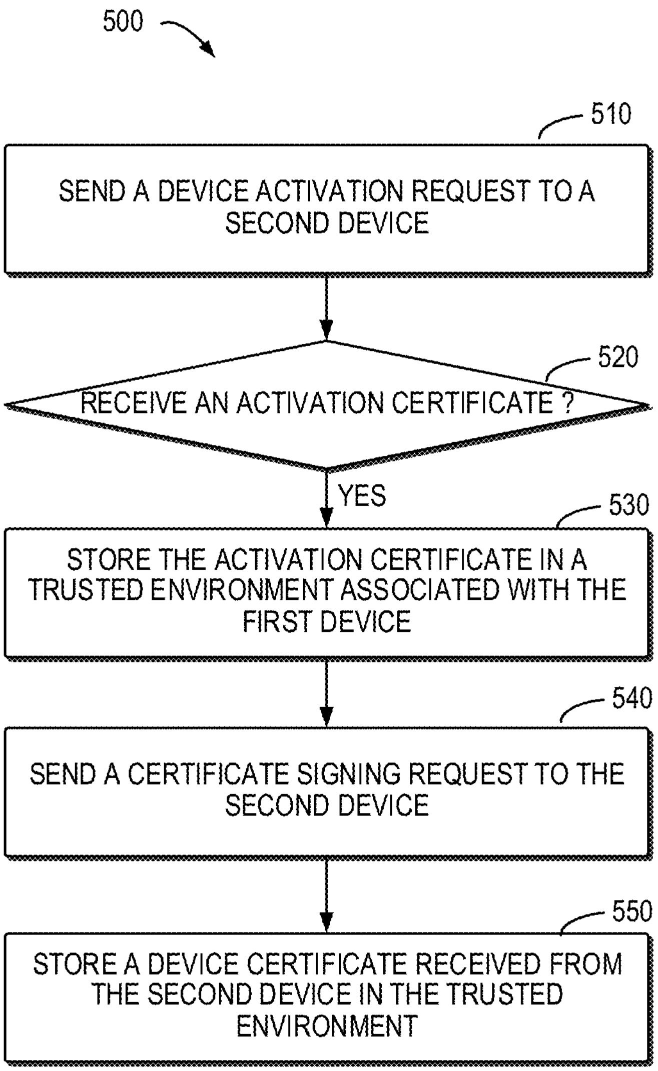
FIG. 5 illustrates a flowchart of a process for device authentication according to some embodiments of the present disclosure.

FIG. 5 illustrates a flowchart of a process 500 for device authentication according to some embodiments of the present disclosure. The process 500 may be implemented at the first device 110.

At block 510, the first device sends a device activation request to a second device. The device activation request includes identity authentication information of the first device.

At block 520, the first device determines whether an activation certificate is received. If the first device determines that the activation certificate is received, then at block 530, the activation certificate is stored in a trusted environment associated with the first device.

In some embodiments, the first device may perform signature verification on the activation certificate based on a first public key in a first asymmetric key pair, and a first private key in the first asymmetric key pair is used by the second device to sign the activation certificate. If it is determined that the signature verification is passed, the first device may store the activation certificate in the trusted environment.

In some embodiments, the first device may generate a second asymmetric key pair. The first device may sign the certificate signing request with a second private key in the second asymmetric key pair and send a second public key in the second asymmetric key pair to the second device.

At block 540, the first device sends a certificate signing request to the second device. The certificate signing request is generated based at least in part on the activation certificate in the trusted environment.

At block 550, the first device stores a device certificate received from the second device in the trusted environment. The device certificate is generated based on the certificate signing request.

In some embodiments, the first device may establish a secure connection between the first device and the device for transmission of at least one of: the device activation request, the activation certificate, the certificate signing request, or the device certificate.

In some embodiments, the first device may send an activation acknowledgement to the second device.

Figure 6:
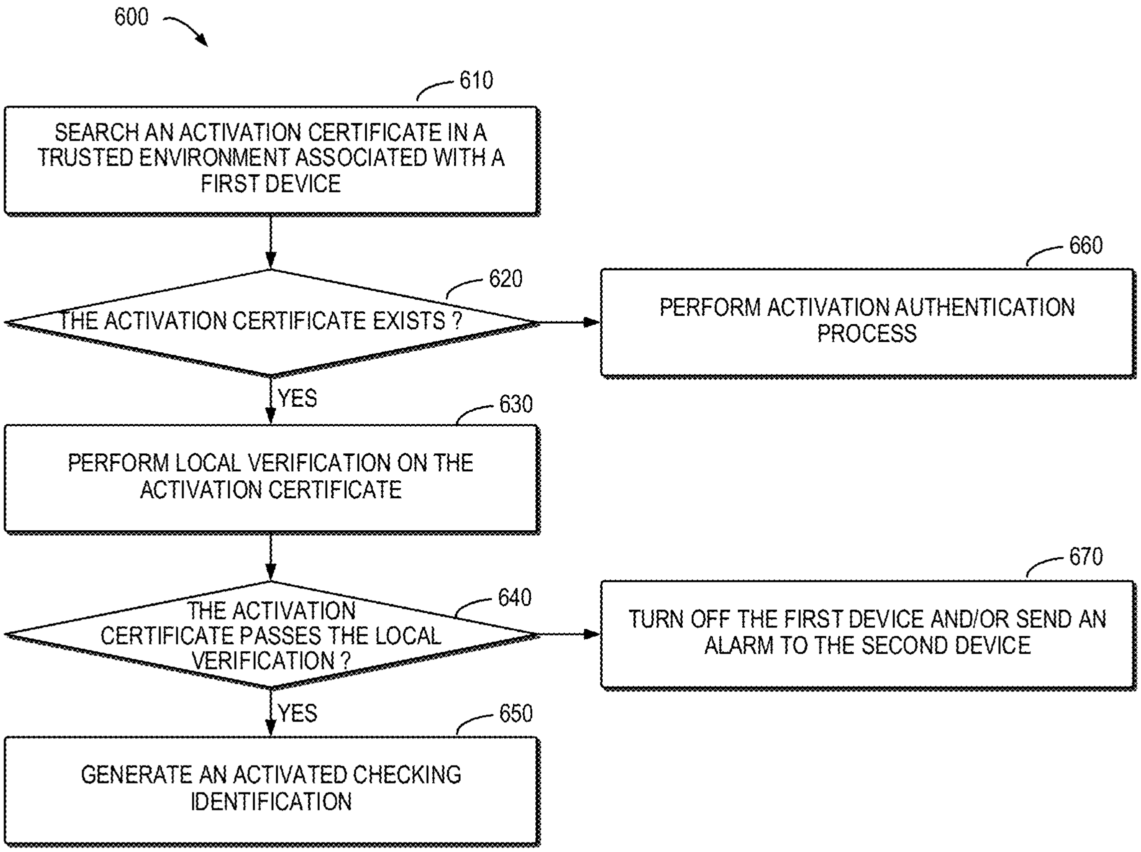
FIG. 6 illustrates a flowchart of a process for device checking according to some embodiments of the present disclosure.

FIG. 6 illustrates a flowchart of a process 600 for device checking according to some embodiments of the present disclosure. The process 600 may be implemented at the first device 110.

At block 610, the first device searches an activation certificate in a trusted environment associated with the first device, and the activation certificate is generated by a second device for authenticating the first device.

At block 610, the first device determines whether the activation certificate exists by a searching result. If it is determined that the activation certificate exists, the first device performs local verification on the activation certificate at block 630. If it is determined that the activation certificate does not exist, then at block 660, execution of the activation authentication process is triggered.

At block 640, the first device determines whether the activation certificate passing the local verification. If the activation certificate passes the local verification, at block 650, the first device generates an activated checking identification. If the activation certificate does not pass the local verification, at block 670, the first device is closed and/or a warning is sent to the second device.

In some embodiments, performing the local verification on the activation certificate comprises verifying at least one of: legality of the activation certificate, or a validity period of the activation certificate.

In some embodiments, the first device may generate a checking request if it is determined that the activation certificate passes the local verification. The checking request is signed with a second private key of a second asymmetric key pair generated in the trusted environment, wherein the second public key has been sent by the first device to the second device during a previous device authentication process. The first device may further send the signed checking request to the second device for identity checking of the first device in a remote service.

Figure 7:
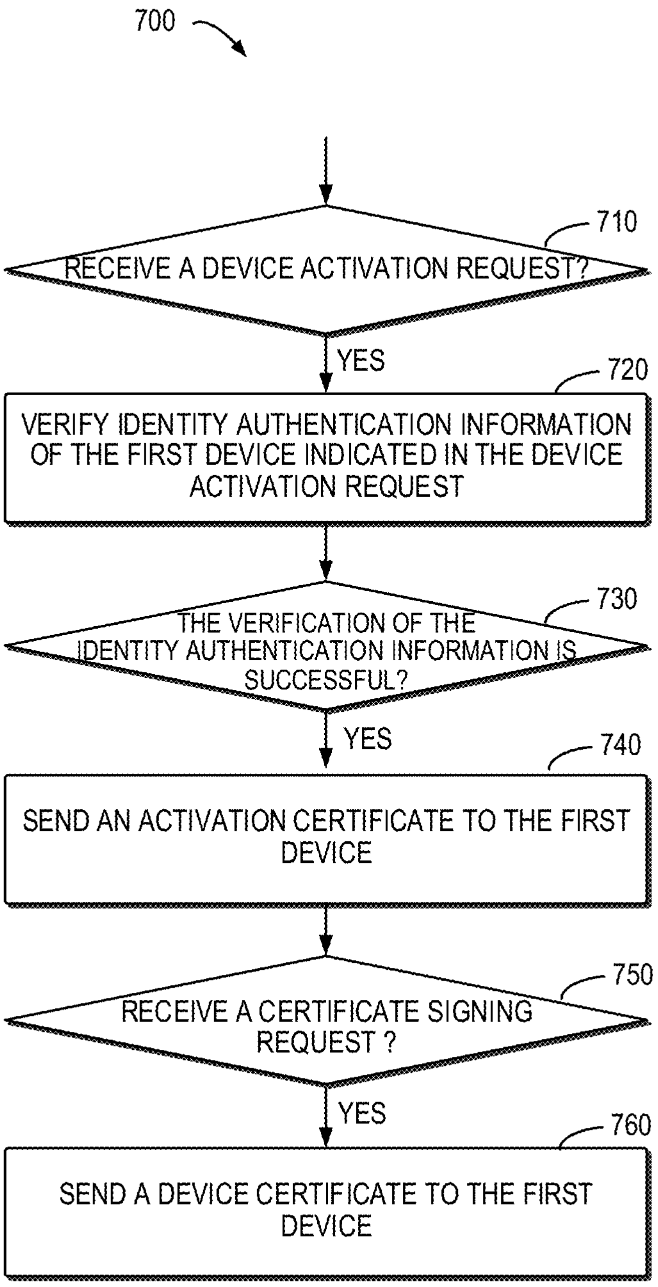
FIG. 7 illustrates a flowchart of a process for device authentication according to some embodiments of the present disclosure.

FIG. 7 illustrates a flowchart of a process 700 for device authentication according to some embodiments of the present disclosure. The process 700 may be implemented at the second device 120.

At block 710, the second device determines whether a device activation request from the first device is received. If it is determined that the device activation request is received, at block 720, the second device verifies identity authentication information of the first device indicated in the device activation request.

At block 730, the second device determines whether the identity authentication information is verified successfully. If it is determined that the identity authentication information is verified successfully, at block 740, the second device sends an activation certificate to the first device. At block 750, if the second device determines that a certificate signing request is received from the first device, at block 750, the second device sends a device certificate to the first device, and the device certificate is generated based on the certificate signing request.

In some embodiments, at least one of the activation request, the activation certificate, the certificate signing request, or the device certificate is transmitted over a secure connection between the first device and the second device.

In some embodiments, the second device may further sign the activation certificate with a first private key of a first asymmetric key pair and send a first public key in the first asymmetric key pair to the first device.

In some embodiments, the second device may further obtain a second public key of a second asymmetric key pair from the certificate signing request. The second asymmetric key pair is generated in a trusted environment associated with the first device. The second device generates the device certificate by signing the second public key.

In some embodiments, the second device may further receive, from the first device, an activation acknowledgement for the first device.

Figure 8:
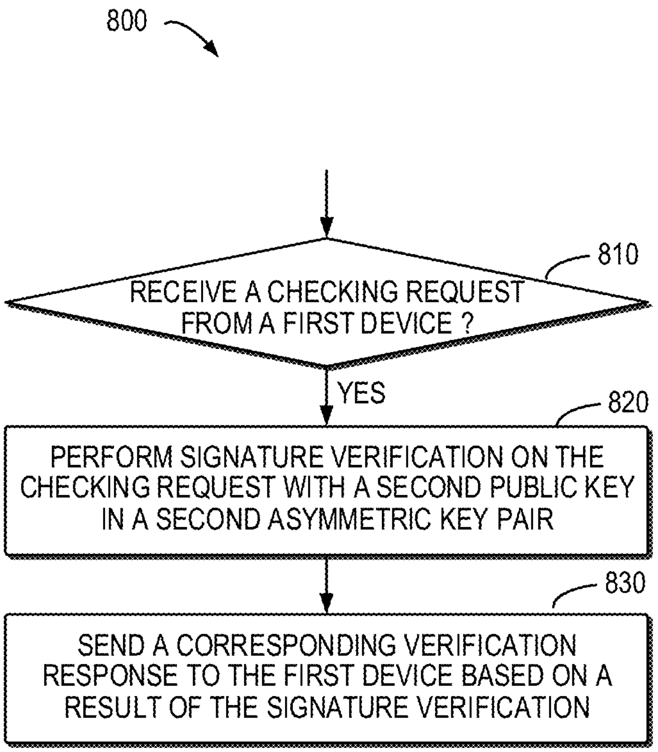
FIG. 8 illustrates a flowchart of a process for device checking according to some embodiments of the present disclosure.

FIG. 8 illustrates a flowchart of a process 800 for device checking according to some embodiments of the present disclosure. The process 800 may be implemented at the second device 120.

At block 810, if the second device receives a checking request from the first device, the second device performs signature verification on the checking request with a second public key in a second asymmetric key pair at block 820. The second asymmetric key pair is generated in a trusted environment associated with the first device. In block 830, the second device sends a corresponding verification response to the first device based on a result of the signature verification.

Example Apparatus and Device

Figure 9:
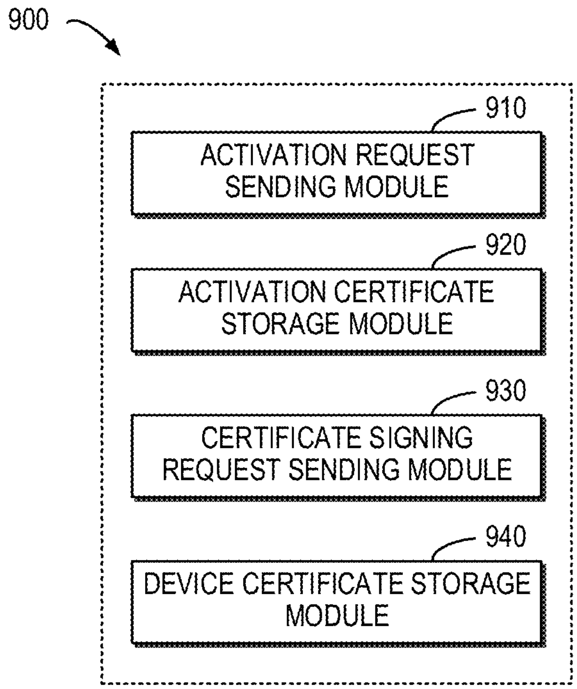
FIG. 9 illustrates a block diagram of an apparatus for device authentication according to some embodiments of the present disclosure.

The embodiments of the present disclosure further provide the corresponding apparatuses for implementing the above methods or processes. FIG. 9 illustrates a schematic structural block diagram of an apparatus 900 for device authentication according to some embodiments of the present disclosure.

As shown in FIG. 9, the apparatus 900 may include an activation request sending module 910, configured to send a device activation request to a second device, the device activation request comprising identity authentication information of the first device. The apparatus 900 may include an activation certificate storage module 920 configured to, in response to receiving an activation certificate from the second device, store the activation certificate in a trusted environment associated with the first device. The apparatus 900 may further include a certificate signing request sending module 930 configured to send a certificate signing request to the second device, the certificate signing request being generated based at least in part on the activation certificate in the trusted environment and a device certificate storage module 940 configured to store a device certificate received from the second device in the trusted environment, the device certificate being generated based on the certificate signing request.

In some embodiments, the apparatus 900 may be further configured to establish a secure connection between the first device and the device for transmission of at least one of: the device activation request, the activation certificate, the certificate signing request, or the device certificate.

In some embodiments, the activation certificate storage module 920 may be further configured to perform signature verification on the activation certificate based on a first public key in a first asymmetric key pair, a first private key in the first asymmetric key pair being used by the second device to sign the activation certificate. If it is determined that the signature verification is passed, the activation certificate is stored in the trusted environment.

In some embodiments, the apparatus 900 may be further configured to generate a second asymmetric key pair and sign the certificate signing request with a second private key in the second asymmetric key pair and send a second public key of the second asymmetric key pair to the second device.

In some embodiments, the apparatus 900 may be further configured to send an activation acknowledgement to the second device.

Figure 10:
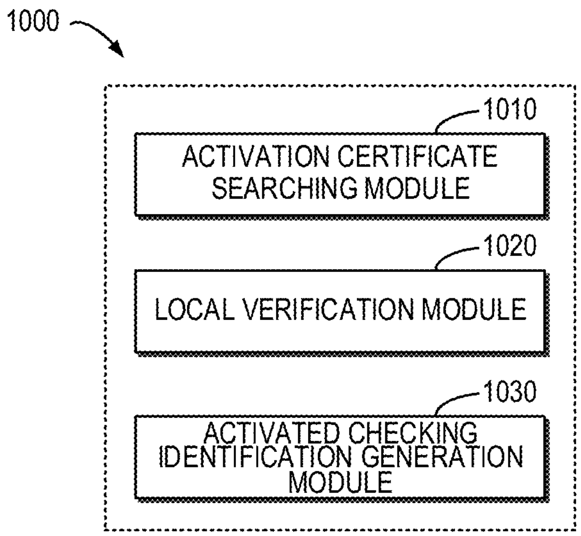
FIG. 10 illustrates a block diagram of an apparatus for device checking according to some embodiments of the present disclosure.

FIG. 10 is a schematic structural block diagram of an apparatus 1000 for device checking according to some embodiments of the present disclosure.

As shown in FIG. 10, the apparatus 1000 may include an activation certificate searching module 1010 configured to search an activation certificate in a trusted environment associated with a first device. The apparatus 1000 may include a local verification module 1020 configured to, in response to determining that the activation certificate exists in the trusted environment, perform local verification on the activation certificate. The apparatus 1000 may further include an activated checking identification generation module 1030 configured to, in response to the activation certificate passing the local verification, generate an activated checking identification for identity checking of the first device for local service.

In some embodiments, performing the local verification on the activation certificate comprises verifying at least one of: legality of the activation certificate, or a validity period of the activation certificate.

In some embodiments, the apparatus 1000 may be further configured to in response to the activation certificate passing the local verification, generate a checking request: signing the checking request with a second private key of a second asymmetric key pair generated in the trusted environment, wherein the second public key of the second asymmetric key pair has been sent by the first device to the second device during a previous device authentication process; and send the signed checking request to the second device for identity checking of the first device in a remote service.

Figure 11:
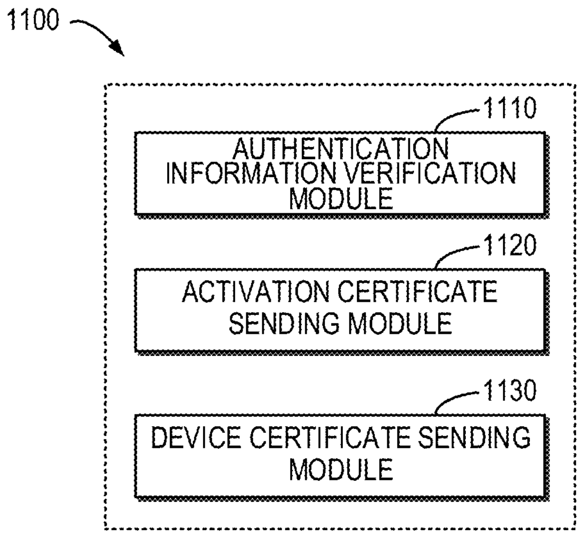
FIG. 11 illustrates a block diagram of an apparatus for device authentication according to some embodiments of the present disclosure.

FIG. 11 is a schematic structural block diagram of an apparatus 1100 for device authentication according to some embodiments of the present disclosure.

As shown in FIG. 11, the apparatus 1100 may include an authentication information verification module 1110 configured to, in response to receiving a device activation request from a first device, verify identity authentication information of the first device indicated in the device activation request. The apparatus 1100 may include an activation certificate sending module 1120, configured to, in response to the verification of the identity authentication information being successful, send an activation certificate to the first device. The apparatus 1100 may further include a device certificate sending module 1130 configured to, in response to receiving a certificate signing request from a first device, send a device certificate to the first device, the device certificate being generated based on the certificate signing request.

In some embodiments, at least one of the activation request, the activation certificate, the certificate signing request, or the device certificate is transmitted over a secure connection between the first device and the second device.

In some embodiments, the apparatus 1100 may be further configured to sign the activation certificate with a first private key of a first asymmetric key pair; and send a first public key in the first asymmetric key pair to the first device.

In some embodiments, the apparatus 1100 may be further configured to obtain a second public key of a second asymmetric key pair from the certificate signing request, the second asymmetric key pair being generated in a trusted environment associated with the first device; and generate the device certificate by signing the second public key.

In some embodiments, the apparatus 1100 may be further configured to receive an activation acknowledgement for the first device from the first device.

Figure 12:
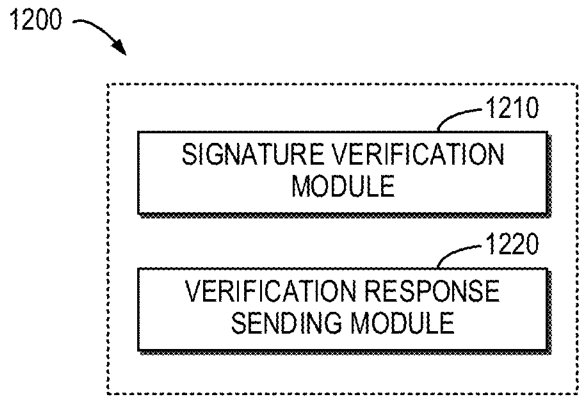
FIG. 12 illustrates a block diagram of an apparatus for device checking according to some embodiments of the present disclosure.

FIG. 12 is a schematic structural block diagram of an apparatus 1200 for device checking according to some embodiments of the present disclosure.

As shown in FIG. 12, the apparatus 1200 may include a signature verification module 1210 configured to, in response to receiving a checking request from the first device, performing signature verification on the checking request with a second public key in a second asymmetric key pair, the second asymmetric key pair being generated in a trusted environment associated with the first device; and a verification response sending module 1220 configured to send a corresponding verification response to the first device based on a result of the signature verification.

The units included in the apparatus 900, the apparatus 1000, the apparatus 1100, and/or the apparatus 1200 may be implemented in various manners, including software, hardware, firmware, or any combination thereof. In some embodiments, one or more units may be implemented using software and/or firmware, such as machine-executable instructions stored on a storage medium. In addition to or as an alternative to machine-executable instructions, some or all of the units of the apparatus 900, the apparatus 1000, the apparatus 1100, and/or the apparatus 1200 may be implemented, at least in part, by one or more hardware logic components. By way of example and not limitation, example types of hardware logic components that may be used include field programmable gate arrays (FPGAs), application specific integrated circuits (ASICs), application specific standards (ASSPs), system-on-a-chip (SOCs), complex programmable logic devices (CPLDs), and the like.

Figure 13:
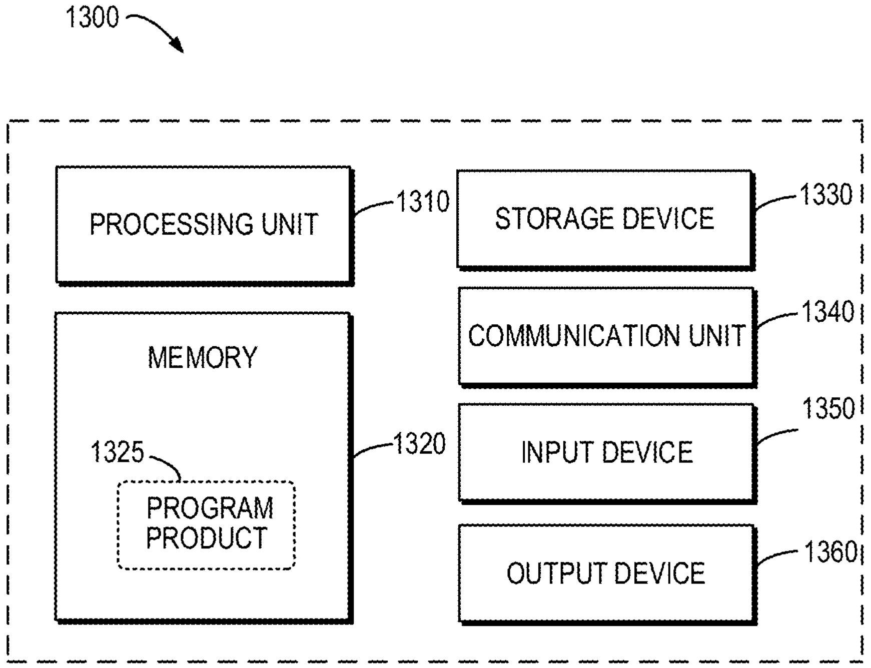
FIG. 13 illustrates a block diagram of a device capable of implementing various embodiments of the present disclosure.

FIG. 13 illustrates a block diagram of a computing device/system 1300 capable of implementing one or more embodiments of the present disclosure. It should be understood that the computing device/system 1300 shown in FIG. 13 is only illustrative and should not constitute any limitation on the functionality and scope of the embodiments described herein.

As shown in FIG. 13, the computing device/system 1300 is in the form of a general-purpose computing device. The components of computing device/system 1300 may include, but are not limited to, one or more processors or processing units 1310, a memory 1320, a storage device 1330, one or more communication units 1340, one or more input devices 1350, and one or more output devices 1360. The processing unit 1310 may be an actual or virtual processor and may execute various processes based on the programs stored in the memory 1320. In a multiprocessor system, multiple processing units execute computer executable instructions in parallel to improve the parallel processing capability of the computing device/system 1300.

The computing device/system 1300 typically includes multiple computer storage medium. Such medium may be any available medium that may be accessed by the computing devices/systems 1300, including but not limited to volatile and non-volatile medium, removable and non-removable medium. The memory 1320 may be volatile memory (such as registers, a cache, a random access memory (RAM)), a non-volatile memory (such as a read-only memory (ROM), an electrically erasable programmable read-only memory (EEPROM), a flash memory), or some combination of them. The storage device 1330 may be a removable or non-removable medium, and may include machine readable medium such as flash drives, disks, or any other medium that may be used to store information and/or data (such as training data for training) and may be accessed within the computing device/system 1300.

The computing device/system 1300 may further include additional removable/non-removable, volatile/nonvolatile storage medium. Although not shown in FIG. 13, a disk driver for reading from or writing to a removable, non-volatile disk (such as a "floppy disk") and an optical disk driver for reading from or writing to a removable, non-volatile optic disk may be provided. In these cases, each driver may be connected to the bus (not shown) by one or more data medium interfaces. The memory 1320 may include a computer program product 1325, which has one or more program modules configured to execute various methods or acts of various embodiments of the present disclosure.

The communication unit 1340 communicates with a further computing devices through the communication medium. Additionally, the functionality of the components of the computing device/system 1300 may be implemented in a single computing cluster or multiple computing machines which may communicate through communication connections. Therefore, the computing device/system 1300 may be operated in a networked environment using logical connections with one or more other servers, network personal computers (PCs), or another network node.

The input device 1350 may be one or more input devices, such as a mouse, a keyboard, a trackball, etc. The output device 1360 may be one or more output devices, such as a display, a speaker, a printer, etc. The computing device/system 1300 may also communicate with one or more external devices (not shown) as needed through the communication unit 1340, such as storage devices, display devices, etc., to communicate with one or more devices that enable users to interact with the computing device/system 1300, or to communicate with any device (such as a network card, a modem, etc.) that enables the computing device/system 1300 to communicate with one or more other computing devices. Such communication may be performed via an input/output (I/O) interface (not shown).

According to the exemplary embodiments of the present disclosure, a computer readable storage medium is provided, on which computer executable instructions or computer programs are stored, wherein the computer-executable instructions or computer programs are executed by a processor to implement the methods described above.

Here, various aspects of the present disclosure are described with reference to flowcharts and/or block diagrams of the methods, apparatuses, devices, and computer program products implemented in accordance with the present disclosure. It should be understood that each block in the flowchart and/or block diagram, and the combination of each block in the flowchart and/or block diagram, may be implemented by computer readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be executed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes may also be executed in a reverse order, depending on the functionality involved. It should also be noted that each block in the block diagram and/or the flowchart, and combinations of blocks in the block diagram and/or the flowchart, may be implemented by a dedicated hardware-based system that executes the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

We claim:

1. A method for device authentication, comprising:

sending, at a first device, a device activation request to a second device, the device activation request comprising identity authentication information of the first device;

in response to receiving an activation certificate from the second device, storing the activation certificate in a trusted environment associated with the first device;

sending a certificate signing request to the second device, the certificate signing request being generated based at least in part on the activation certificate in the trusted environment; and storing a device certificate received from the second device in the trusted environment, the device certificate being generated based on the certificate signing request.

2. The method of claim 1, further comprising:

establishing a secure connection between the first device and the device for transmission of at least one of: the device activation request, the activation certificate, the certificate signing request, or the device certificate.

3. The method of claim 1, wherein storing the activation certificate in the trusted environment associated with the first device comprises:

performing signature verification on the activation certificate based on a first public key in a first asymmetric key pair, a first private key in the first asymmetric key pair being used by the second device to sign the activation certificate; and in response to the signature verification being passed, storing the activation certificate in the trusted environment.

4. The method of claim 1, further comprising:

generating a second asymmetric key pair in the trusted environment;

signing the certificate signing request with a second private key in the second asymmetric key pair; and sending a second public key in the second asymmetric key pair to the second device.

5. The method of claim 1, further comprising:

sending an activation acknowledgement to the second device.

6. A method for device authentication, comprising:

in response to receiving a device activation request from a first device, verifying, at a second device, identity authentication information of the first device indicated in the device activation request;

in response to the verification of the identity authentication information being successful, sending an activation certificate to the first device; and in response to receiving a certificate signing request from the first device, sending a device certificate to the first device, the device certificate being generated based on the certificate signing request, the method further comprising checking the first device by:

in response to receiving a checking request from the first device, performing signature verification on the checking request with a second public key in a second asymmetric key pair, the second asymmetric key pair being generated in a trusted environment associated with the first device; and sending a corresponding verification response to the first device based on a result of the signature verification.

7. The method of claim 6, wherein at least one of the device activation request, the activation certificate, the certificate signing request, or the device certificate is transmitted over a secure connection between the first device and the second device.

8. The method of claim 6, further comprising:

signing the activation certificate with a first private key of a first asymmetric key pair; and sending a first public key in the first asymmetric key pair to the first device.

9. The method of claim 6, further comprising generating the device certificate by:

obtaining a second public key of a second asymmetric key pair from the certificate signing request, the second asymmetric key pair being generated in a trusted environment associated with the first device; and generating the device certificate by signing the second public key.

10. The method of claim 6, further comprising:

receiving an activation acknowledgement for the first device from the first device.

11. An electronic device, comprising:

at least one processing unit; and at least one memory coupled to the at least one processing unit and storing instructions for execution by the at least one processing unit, the instructions, when executed by the at least one processing unit, causing the electronic device to perform acts for device authentication, the acts comprising:

sending, at a first device, a device activation request to a second device, the device activation request comprising identity authentication information of the first device;

in response to receiving an activation certificate from the second device, storing the activation certificate in a trusted environment associated with the first device;

sending a certificate signing request to the second device, the certificate signing request being generated based at least in part on the activation certificate in the trusted environment; and storing a device certificate received from the second device in the trusted environment, the device certificate being generated based on the certificate signing request.

12. The method of claim 1, wherein the identity authentication information of the first device comprises at least one of: a device identification, or password information.

13. The method of claim 6, wherein performing the local verification on the activation certificate comprises verifying at least one of:

legality of the activation certificate, or a validity period of the activation certificate.

14. The method of claim 6, further comprising:

in response to the activation certificate passing the local verification, generating a checking request;

signing the checking request with a second private key of a second asymmetric key pair generated in the trusted environment, wherein the second public key of the second asymmetric key pair has been sent by the first device to the second device during a previous device authentication process; and sending the signed checking request to the second device for identity checking of the first device in a remote service.

15. The method of claim 6, wherein the identity authentication information of the first device comprises at least one of: a device identification, or password information.

16. The device of claim 11, wherein the acts further comprise:

establishing a secure connection between the first device and the device for transmission of at least one of: the device activation request, the activation certificate, the certificate signing request, or the device certificate.

17. The device of claim 11, wherein storing the activation certificate in the trusted environment associated with the first device comprises:

performing signature verification on the activation certificate based on a first public key in a first asymmetric key pair, a first private key in the first asymmetric key pair being used by the second device to sign the activation certificate; and in response to the signature verification being passed, storing the activation certificate in the trusted environment.

18. The device of claim 11, wherein the acts further comprise:

generating a second asymmetric key pair in the trusted environment;

signing the certificate signing request with a second private key in the second asymmetric key pair; and sending a second public key in the second asymmetric key pair to the second device.

19. The device of claim 11, wherein the acts further comprise:

sending an activation acknowledgement to the second device.

* * * * *